Patented Sept. 20, 1938

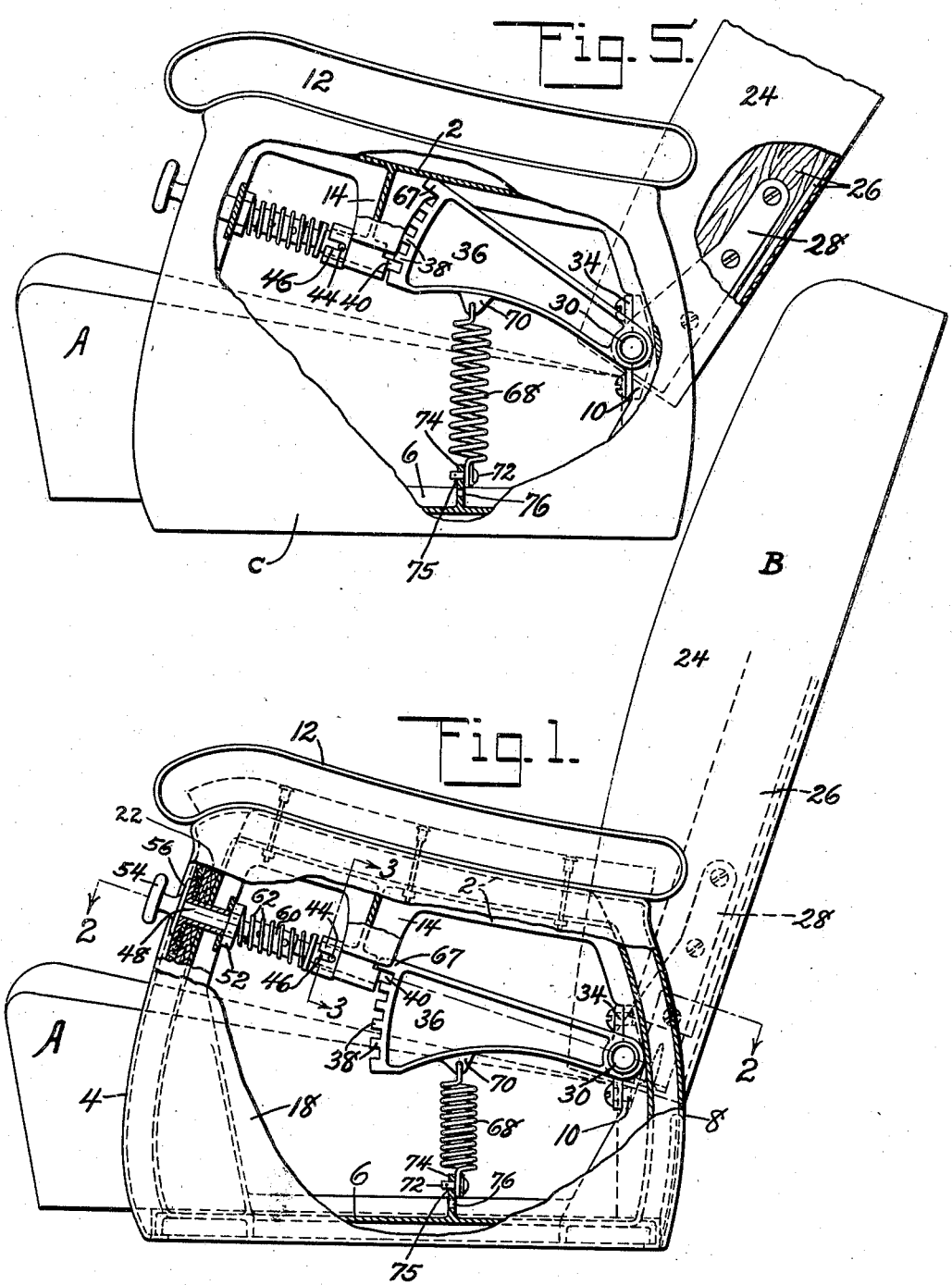

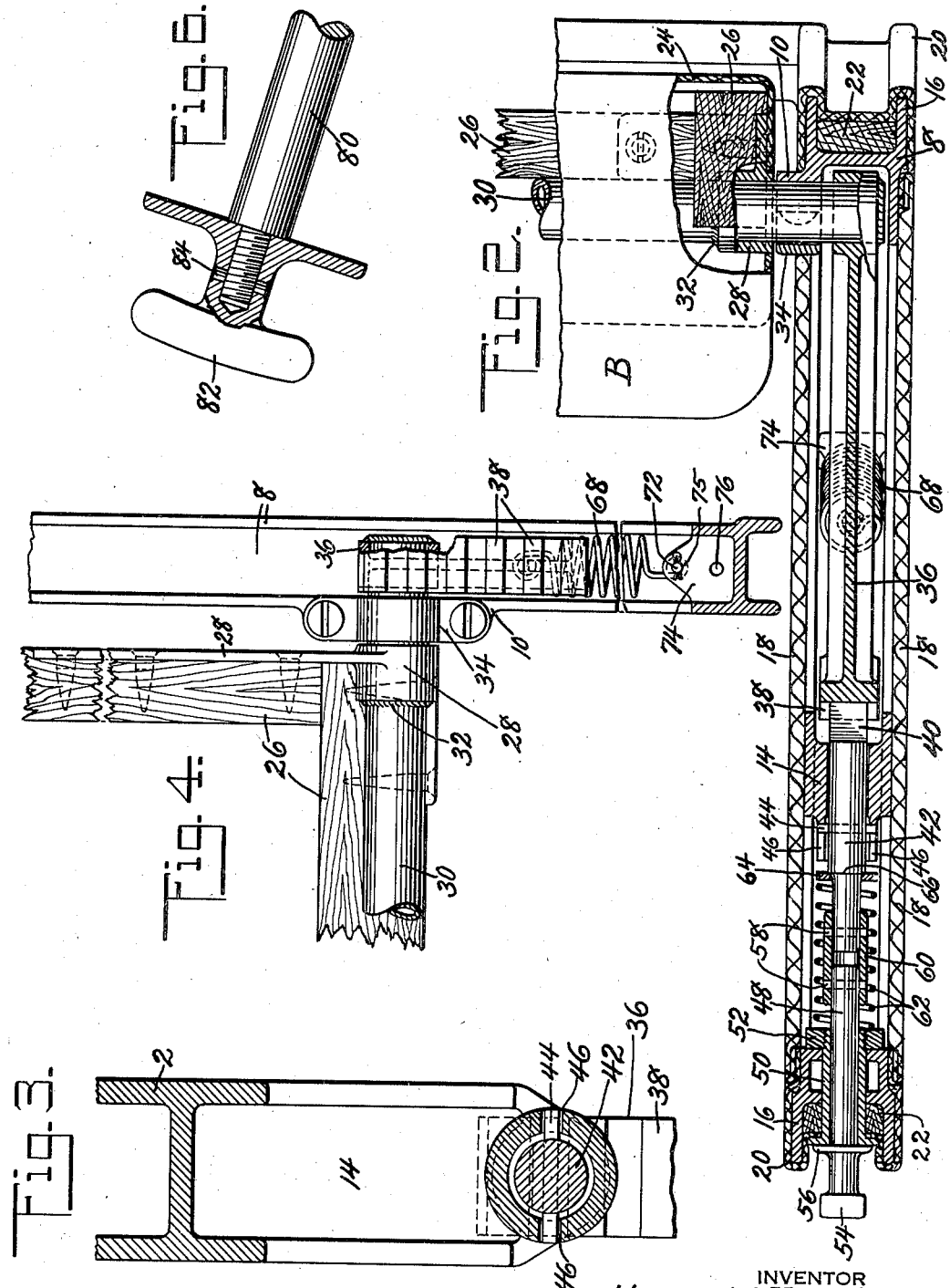

2,130,781

UNITED STATES PATENT OFFICE 2,130,781

RECLINING SEAT

Victor Willoughby, Ridgewood, N. J., assignor to American Car and Foundry Company, New York, N. Y., a corporation of New Jersey Application April 24, 1936, Serial No. 76,093

2 Claims. (Cl. 155—163)

This invention relates to reclining seats in general, and in particular to reclining seats for use in passenger carrying vehicles such as rail cars, buses and trolley cars.

In order to make rail and bus travel attractive to the public it is necessary that the seats be made as comfortable as possible. Passengers making long journeys become very fatigued if required to remain in one position for any great length of time, but if the passenger is able to easily and quickly vary the position of the seat back the body weight may be shifted and the apparent fatigue greatly reduced. It is necessary that the means for shifting the position of the back be readily available to the seated passenger in order to reduce to a minimum the energy required in changing the inclination of the seat back. It is an object, therefore, of the present invention to provide a reclining seat back which may be readily shifted to a plurality of inclinations with a minimum amount of effort on the part of the occupant.

Another object of the invention is the provision of a reclining seat back wherein the operating mechanism is within easy reach of the occupant of the seat.

A further object of the invention is the provision of a simple, easily operated mechanism for reclining seat backs which will secure the back in a plurality of inclined positions.

These and other objects of the invention will be apparent to one skilled in the art from a study of the following description and accompanying drawings, in which:

Figure 1 is an end view of a portion of the seat with parts of the end frame covering removed to more fully disclose the operating mechanism with the back upright;

Fig. 2 is a sectional view of the seat end frame taken substantially on line 2—2 of Fig. 1;

Fig. 3 is a sectional view taken on line 3—3 of Fig. 1;

Fig. 4 is a partial sectional view showing the manner of mounting the seat back on end frame;

Fig. 5 is an end view similar to that shown in Fig. 1, but with the seat back reclined, and Fig. 6 is a sectional view of a modified form of operating handle.

Reference is now had to the drawings wherein only the necessary parts of the seat, such as the cushion A, back B and seat end frame C, are disclosed. The seat end frame is of any desired construction, but as shown it consists of a top member 2, front member 4, bottom member 6 and a rear member 8 which is formed with a bearing portion 10 cast integral therewith. The top member has arm rest 12 attached thereto and is formed with a suitably braced depending bearing bracket 14, the purpose of which will be later described. The front and rear members are provided with flanges 16 to which the side finish panels 18 and edge binding 20 are secured. A wood filler strip 22 is placed between the flanges, as shown, but it is to be understood that the exact manner in which the end frame is finished is immaterial to the present invention.

The seat back is of conventional construction wherein the upholstery 24 is secured to the back frame 26 to which is secured at either side the back end casting 28. The back end casting carries a suitable pivot rod, such as pipe, or tube, 30 welded as at 32 to the casting and extending outward beyond the casting for movable support in the bearing 10 previously referred to. Bearing cap 34 fits over the pivot rod or tube and retains the seat back in a movable position upon the end frames.

The tube or pivot rod is of sufficient length to extend beyond the bearing and receive the gear or control segment 36 immovably secured to the tube as by welding, thus insuring that the movement of the control member and seat back will be in unison. The control member or segment is provided with teeth 38 adapted to engage a tooth or projection 40 formed on the end of slide rod 42 slidably mounted in bearing bracket 14 previously referred to. The rod is provided with transversely projecting pin 44 adapted to engage the walls of slot 46 formed in the bearing bracket, thus insuring non-rotation of the slide rod and the proper engagement between the projection and the teeth of the control member.

A rod 48 is provided which is slidably mounted in the front member 4 by means of sleeve 50 which is held in place by the nut 52, and the rod is provided with a head or knob 54 and stop shoulder 56 which engages the sleeve to limit the inward movement of the rod. The two rods 42 and 48 are substantially in alignment and have their adjacent ends bored to receive pins 58 passing through a coupling 60 which thus ties the rods together for joint movement. Spring 62 is provided having one end bearing against the sleeve retaining nut, while the other end bears against the washer 64, abutting shoulder 66 formed on rod 42. It is thus seen that the two rods are tied together to form a single slide rod or retainer which is constantly urged toward the control member or gear segment by the spring and it is also seen that this rod may be moved by applying a pull on the head or knob 54.

The coupling member is of such a length as to limit the outward movement of the slide rod as is obvious and the movement of the rod is sufficient to permit the teeth of the control member to readily pass the projection, but the control member has one tooth 67 which is longer than the others and cannot pass the projection 40 on the slide rod, thus limiting the righting movement of the seat back and control member.

As shown clearly in the drawings, a spring 68 is provided which has one end secured to a lug 70 formed on control member 36, while the opposite end thereof is connected by means of a pin or bolt 72 to an upstanding lug 74 formed on the bottom member 6 of the side frame. The lug 74 is provided with openings 75 and 76 each adapted to receive the bolt 72 whereby to permit of adjustment of the tension of spring 68. As will be apparent, the spring 68 constantly exerts a downward force on the control member 36. The backward or reclining movement of the seat back B is limited by the top member of the side frame which constitutes an abutment for the control member, or the lower tooth of said control member may be formed in a manner similar to the upper tooth 67 whereby to constitute a stop member.

The modification shown in Fig. 6 shows a slide rod very similar to that just described but the slide rod 80 is extended outward in one piece to receive the control knob 82 threaded upon the rod and secured in place by the transverse pin 84. It is obvious that this type of slide rod is interchangeable with that previously described and does not affect the operation of the device.

The operation of the device is as follows: Assuming the seat back in the position shown in Fig. 1, it is only necessary to pull out the control knob with its coupled slide rod and press backward on the seat back until it has reached the desired position at which time the knob can be released and the slide rod under the action of the compression spring will move into engagement with the teeth of the control member and hold the seat back in that position. During the backward movement of the seat back the spring 68 has been placed under tension and if the slide rod is now moved outward and pressure removed from the back, it will return to the upright or any other desired position of its own accord after which the slide rod will hold it in that position.

It is thus seen that an extremely simple, convenient and strong seat back control device is provided, but it is obvious that various modifications and improvements thereof will be suggested to persons skilled in the art and such modifications and improvements are contemplated as fall within the scope of the following claims.

What is claimed is:

1. In a seat, an end frame, a seat back pivotally supported by the end frame, and means for holding the seat back in a predetermined position comprising a control member rigidly connected with the seat back and projecting forwardly therefrom, the free end portion of said control member being formed with adjusting teeth and a stop projection, a tubular bearing depending from the upper portion of the end frame, the front portion of said bearing being formed with longitudinal guide slots, and an operating member journaled in the bearing and extending through the forward portion of the end frame, said operating member being substantially axially alined with the control arm and having a reduced extremity for engaging said stop projection and between the teeth of said control member to limit the movement of the latter and hold same in adjusted position, and lateral projections to normally engage said longitudinal guide slots to retain said reduced extremity in tooth engaging position.

2. In a seat, an end frame, a seat back pivotally supported by the end frame, and means for holding the seat back in predetermined position comprising a control member rigidly connected with the seat back and projecting forwardly therefrom, the free portion of said control member being formed with adjusting teeth and a stop projection, a tubular bearing depending from the upper portion of the end frame, the front portion of said bearing being formed with longitudinal guide slots, an operating member journalled in the bearing and extending through the forward portion of the end frame, said operating member being substantially axially aligned with the control arm and having a reduced extremity arranged to engage said stop projection and between the teeth of said control member to limit the movement of the latter and hold the same in adjusted position, said operating member being provided with lateral projections arranged to normally engage the longitudinal guide slots to retain said reduced extremity in tooth engaging position, and spring means interposed between and connected to the control member and the end frame and so arranged as to constantly urge the control member in a downward direction.

VICTOR WILLOUGHBY.